United States Patent [19]

Eggermont

[11] 4,229,802
[45] Oct. 21, 1980

[54] DIGITAL ADDING DEVICE

[75] Inventor: Ludwig D. J. Eggermont, Eindhoven, Netherlands

[73] Assignee: U.S. Philips Corporation, New York, N.Y.

[21] Appl. No.: 951,224

[22] Filed: Oct. 13, 1978

[30] Foreign Application Priority Data

Nov. 10, 1977 [NL] Netherlands ............... 7712367

[51] Int. Cl.² ............................................. G06F 7/50
[52] U.S. Cl. .................................. 364/786; 364/724
[58] Field of Search ............... 364/724, 781, 783, 784, 364/786, 787

[56] References Cited

U.S. PATENT DOCUMENTS

| | | | |
|---|---|---|---|
| 3,023,962 | 3/1962 | Stafford | 364/787 |
| 3,265,876 | 8/1966 | Lethin | 364/783 |

*Primary Examiner*—Jerry Smith
*Attorney, Agent, or Firm*—Thomas A. Briody; Jack Oisher; James J. Cannon, Jr.

[57] ABSTRACT

Digital adding device for determining the sum of a plurality of binary coded numbers, having a digital parallel-accumulator having a first store for storing intermediate sums and intermediate carries which can be taken over into a second store by means of a switching circuit in order to be processed to the final sum in a final adder. This enables the use of the digital parallel-accumulator for determining consecutive sums in a more efficient manner.

2 Claims, 5 Drawing Figures

DIGITAL ADDING DEVICE

BACKGROUND OF THE INVENTION

1. Field of the Invention

The invention relates to a digital adding device for determining the sum of a plurality of binary coded numbers, the device including a digital parallel-accumulator provided with a plurality of full adders corresponding to the plurality of bits of the numbers to be added and with a first memory storage element connected to outputs of the full adders for storing intermediate sums and intermediate carries resulting from the addition, the device also including a final adder for determining the sum of the numbers stored in the first memory storage element and, in addition, a circuit for coupling the final adder to the first memory storage element as well as a time control circuit for controlling the digital parallel-accumulator and the final adder.

2. Description of the Prior Art

Such a digital adding device is disclosed in U.S. Pat. No. 3,023,962.

The invention also relates to a digital filter including such a digital adding device.

Digital adding devices are used in digital filters, wherein an output codeword is formed as the weighted sum of a plurality of binary coded input codewords to be applied to the filter.

In the prior art digital adding device disclosed in U.S. Pat. No. 3,023,962 the total time required for determining a number of sums may be very long because forming a new sum cannot take place until the intermediate carry resulting from the addition has been able to exercise its influence on the final result and the final result has been read. In practice this means that, for example, when this prior art adding device is used in a digital filter the output frequency, that is to say the frequency with which the output codewords of the filter occur, is determined by both the number of input codewords to be weighted in an output codeword and the time required for having the carries exercice their influence on the final sum.

It is an object of the invention to provide a digital adding device of the type defined in the preamble in which the total time required for determining a plurality of sums is drastically reduced.

SUMMARY OF THE INVENTION

The digital adding device according to the invention is therefore characterized in that the coupling circuit comprises a switching circuit connected to the first memory storage element and having a first and a second switching state and a second memory storage element connected to the final adder and in that the time control circuit also controls the coupling circuit so that in the first switching state the first memory storage element is coupled to inputs of the full adders and in the second switching state the first memory storage element is coupled to the second memory storage element for taking over the intermediate sums and the intermediate carries.

The result of using the digital adding device according to the invention in a digital filter is that the output frequency of the digital filter is only determined by either the time required for determining the intermediate sum of the input codewords to be weighted, or the time required by the carries to exercise their influence on the final result, depending on which of the two periods of time is the longer.

BRIEF DESCRIPTION OF THE DRAWINGS

Embodiments of the digital adding device according to the invention will now be explained in greater detail with reference to the drawing, in which.

DESCRIPTION OF THE PREFERRED EMBODIMENTS

Figure 1:
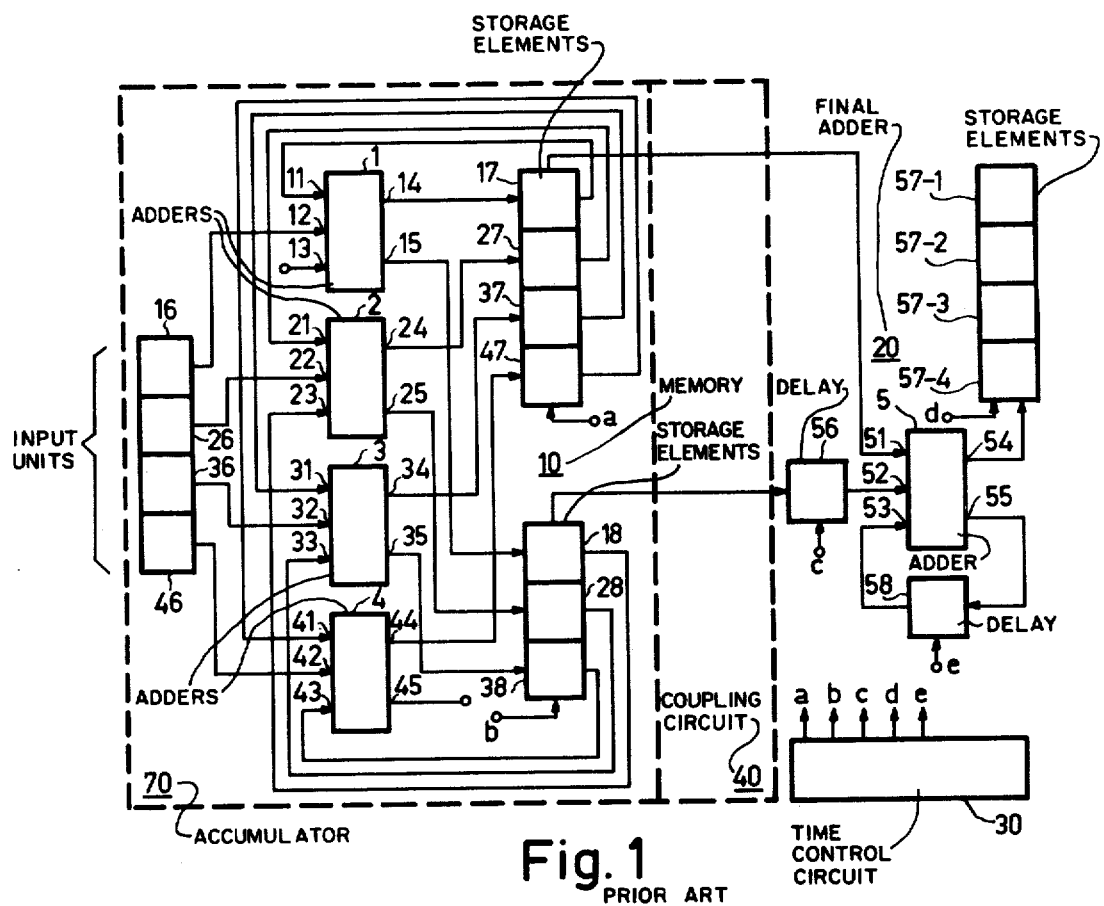
FIG. 1 shows a prior art digital adding device.

It should be noted that the digital adding devices shown in the drawing are arranged around a number of adders which are each provided with a one-digit reference numeral. The adders comprise inputs and outputs denoted by two-digit reference numerals, the first digit being equal to the reference numeral of the associated adder and the second digit denoting whether an input or an output is concerned. The inputs are characterized by a second digit equal to 1, 2 or 3 and the outputs have for their second digit a 4 or a 5. The elements coupled to the adders are also provided with reference numerals consisting of two digits, the first digit being equal to the reference numeral of the associated adder. Any reference made in the following description to a group of inputs or outputs or a set of elements utilizes group reference numerals consisting of a letter-digit combination. For example X1 denotes the groups of inputs having the digit 1 as the second digit of the reference numerals of the relevant inputs.

The prior art digital adding device as shown in FIG. 1 is arranged for determining the sum of a number of four-bit binary coded numbers and comprises to that end a digital-parallel-accumulator 70 having four full adders 1, 2, 3 and 4. The bits having a successively greater weight are applied by input units 16, 26, 36 and 46 respectively (collectively indicated by X6 hereafter) to the inputs 12, 22, 32 and 42, respectively (hereafter collectively denoted by X2). Connected to the outputs 14, 24, 34 and 44 (X4) are memory storage elements 17, 27, 37 and 47 (X7) and to the outputs 15, 25, 35 (X5) memory storage elements 18, 28 and 38 (X8) which can each store one bit. The storage elements X7 and X8 constitute together the first memory 10 and are connected to the inputs 11, 21, 31 and 41 (X1) or to the inputs 23, 33 and 43 (X3), respectively, of the full adders 1, 2, 3 and 4, in such a manner that the bits of the numbers stored in the first memory 10 are added, by the full adders 1, 2, 3 and 4, to the bits of the next number to be applied to the inputs X2 by the input units X6.

After the last number of the series of numbers the sum of which must be determined has been applied to the inputs X2 and has led to a result in the first memory 10, that is to say has resulted in an intermediate sum and an intermediate carry, a final adder 20 which is connected to the first memory via a coupling circuit 40 determines the final sum of the numbers stored in the storage elements X7 and X8. To that end the final adder 20 comprises a full adder 5 having a first input 51, to which the bits of the intermediate sum stored in the storage elements X7 are consecutively applied, a second input 52 to which the bits of the intermediate carry stored in storage element X8 are applied consecutively via a delay device 56 and a third input 53 to which the carry bit occurring at the output 55 and being the result from the addition is applied, via a delay device 58. The bits occurring at the output 54 of the full adder 5 are entered into the storage elements 57-1, 57-2, 57-3 and 57-4 (57-X) and form the final sum there. The adding procedure outlined above is effected under the control of a time control circuit 30 which generates in known manner control signals a, b, c, d and e and supplies them to the control inputs, denoted by a, b, c, d and e of the accumulator and to the final adder.

It should be noted that a logic "0" must always be offered to input 13 of the full adder 1 and that normally a logic "0" will occur at output 45 of the full adder 4, unless the sum to be determined cannot be represented by a number consisting of four bits ("overflow") in which case a logic "1" will occur at output 45.

The operation of the prior art digital adding device described with reference to FIG. 1 is further explained below by means of a number example, use being made of the truth table, shown in Table 1, for a full adder. To indicate the inputs and outputs of the full adder this Table states the reference numerals associated with the full adder 1.

TABLE 1

| I1 | I2 | I3 | I4 | I5 |
|----|----|----|----|----|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

Table 2 shows schematically the binary values which successively occur at the different inputs and outputs of the adders 1, 2, 3 and 4 during the determination of the sum of the numbers 2+1+1+4=8, or, in binary coded form, 0010+0001+0001+0100=1000.

TABLE 2

| p= | 4 | 3 | 2 | 1 | | t= |
|----|---|---|---|---|---|----|
| q=1 | 0 | 0 | 0 | 0 | | t1 |
| 2 | 0 | 0 | 1 | 0 | | t1 |
| 3 | 0 | 0 | 0 | 0 | + | t1 |
| 4 | 0 | 0 | 1 | 0 | | t2 |
| 5 | 0 | 0 | 0 | 0 | | t2 |
| 1 | 0 | 0 | 1 | 0 | | t3 |
| 2 | 0 | 0 | 0 | 1 | | t3 |
| 3 | 0 | 0 | 0 | 0 | + | t3 |
| 4 | 0 | 0 | 1 | 1 | | t4 |
| 5 | 0 | 0 | 0 | 0 | | t4 |
| 1 | 0 | 0 | 1 | 1 | | t5 |
| 2 | 0 | 0 | 0 | 1 | | t5 |
| 3 | 0 | 0 | 0 | 0 | + | t5 |
| 4 | 0 | 0 | 1 | 0 | | t6 |
| 5 | 0 | 0 | 0 | 1 | | t6 |
| 1 | 0 | 0 | 1 | 0 | | t7 |
| 2 | 0 | 1 | 0 | 0 | | t7 |
| 3 | 0 | 0 | 1 | 0 | | t7 |
| 4 | 0 | 1 | 0 | 0 | | t8 |
| 5 | 0 | 0 | 1 | 0 | | t8 |

TABLE 3

| p=5 | | |
|-----|---|---|
| q= | | t= |
| 1 | 0 | t9 |
| 2 | 0 | t9 |
| 3 | 0 + | t9 |
| 4 | 0 | t10 |
| 5 | 0 | t10 |
| 1 | 0 | t11 |
| 2 | 0 | t11 |
| 3 | 0 + | t11 |
| 4 | 0 | t12 |
| 5 | 0 | t12 |
| 1 | 1 | t13 |
| 2 | 1 | t13 |
| 3 | 0 + | t13 |
| 4 | 0 | t14 |
| 5 | 1 | t14 |
| 1 | 0 | t15 |
| 2 | 0 | t15 |
| 3 | 1 + | t15 |
| 4 | 1 | t16 |
| 5 | 0 | t16 |

The letter combination pq in Table 2 represents the reference numerals of the inputs and the outputs and the letter t specifies, provided with the index 1, 2 etc., the successive instants at which a change of the inputs and outputs is realized. Thus, at the instant t1 the number 0000 is present at the inputs X1, the number 0010 at the inputs X2, the number 000 at the inputs X3 and a logic 0 at input 13.

The full adders 1, 2, 3 and 4 supply at the outputs X4 at the instant t2 the sum 0010 of these numbers and at the outputs X5 the carry 000 resulting from the addition of numbers, a 0 then appearing at output 45. Via the storage elements X7 the sum 0010 is applied to the inputs X1 at the instant t3 while at this instant t3 the carry 000 is also applied via the storage elements X8 to the inputs X3 and a logic 0 to input 13. In addition, the second number 0001 is applied at instant t3 to the inputs X2 by the input units X6.

This process is continued until all numbers whose sum must be determined have been processed into an intermediate sum 0100 and an intermediate carry 010. From instant t8 onwards these numbers are available in the first storage element 10 and are thereafter added in final adder 20, implemented as a series-adder, the bits of the final sum being produced successively at the output 54, in an ascending order from the least to the most significant bit.

Table 3 shows schematically the accumulation process in the final adder.

So the final sum is 1000, being the binary coded number whose bits successively occur at the instants t16, t14, t12 and t10 at the output denoted by pq=54.

If now sums of different series of numbers must be successively determined with the prior art digital adding device of FIG. 1, the formation of a new sum cannot be started until the preceding final sum has been computed. This means that, in the example given, a new number cannot be offered to the inputs X2 before an instant located after instant t16 so that the total time required for determining a number of sums is very long.

Figure 2:
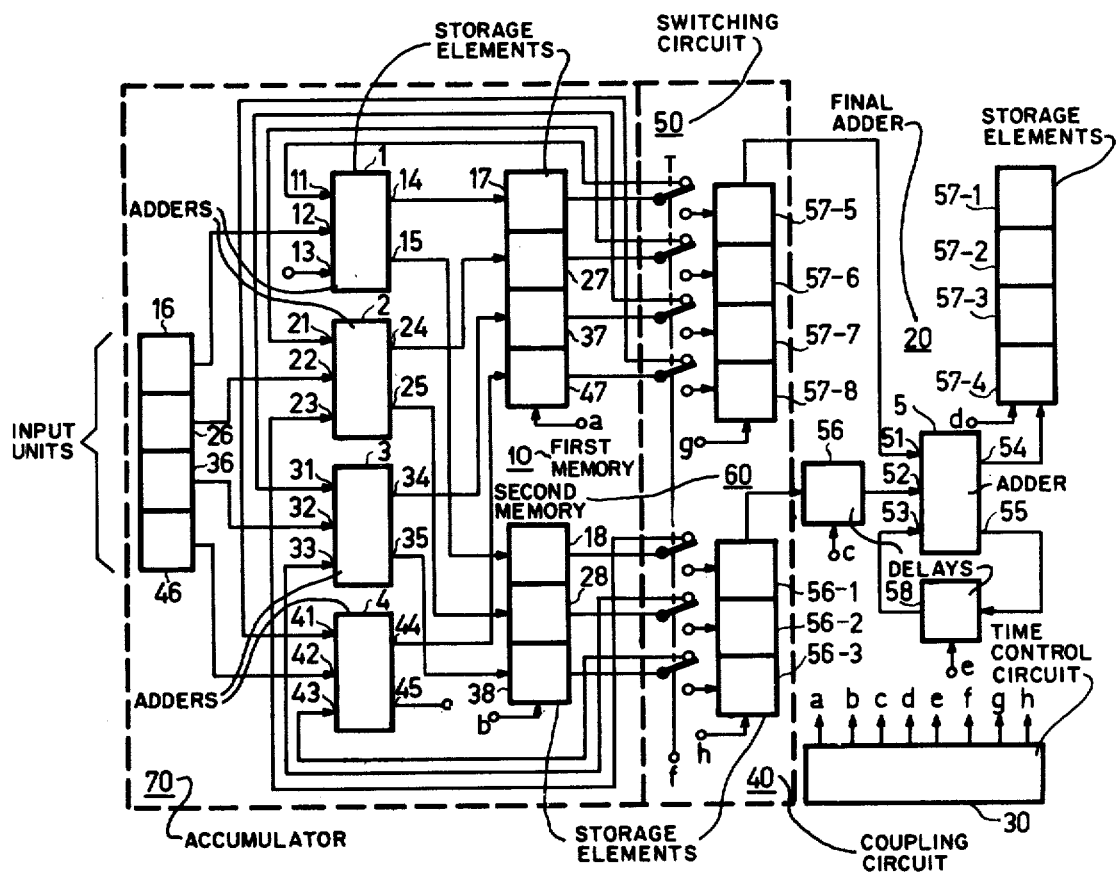
FIG. 2 shows a first embodiment of the digital adding device according to the invention, the final adder being implemented as a series adder.

The embodiment of the digital adding device according to the invention shown in FIG. 2 is different from the prior art digital adding device of the FIG. 1 in that the coupling circuit 40 comprises a switching circuit 50, connected to the first memory storage element 10, having a first and a second switching state and a second memory storage element 60 connected to the final adder 20 and in that the time control circuit 30 also controls the coupling circuit 40 in such a manner that in the first switching state the first memory 10 is coupled to inputs X1, X3 of the full adders 1, 2, 3 and 4 and in the second switching state the first memory 10 is coupled to the second memory 60 for taking over the intermediate sum and the intermediate carries.

The digital adding device shown in FIG. 2 furthermore comprises, just like the prior art device shown in FIG. 1, a digital parallel-accumulator 70, a final adder 20 and a time control circuit 30.

When switching circuit 50 is in the first switching state, the operation of the parallel-accumulator 70 can schematically be shown, as in Table 2, for the prior art device for adding 2+1+1+4. After, at an instant located after instant t8, the switching circuit 50 has been adjusted from the first to the second switching state by means of a control signal supplied by the time control circuit 30, the intermediate sum 0100 and the intermediate carry 010 are taken over in the respective storage elements 57-5, 57-6, 57-7 and 57-8 (57-Y), 56-1, 56-2 and 56-3 (56-Y), which together constitute the second memory 60. Thereafter the switching circuit 50 is reset to the first switching state and a new series of numbers can be presented to the inputs X2.

Processing this new series of numbers into a new intermediate sum and a new intermediate carry is then effected in the same manner as indicated in Table 2 for adding 2+1+1+4, while, independent thereof, processing the first intermediate sum and the first intermediate carry to the first final sum is effected simultaneously in the final adder 20 in the manner indicated in Table 3.

It should be noted that the use of the delay element 56 can be avoided in several ways, for example by directly applying the least significant bit of the intermediate sum, stored in the storage elements 57-Y, that is to say the bit stored in storage element 57-5, to storage element 57-4.

Figure 3:
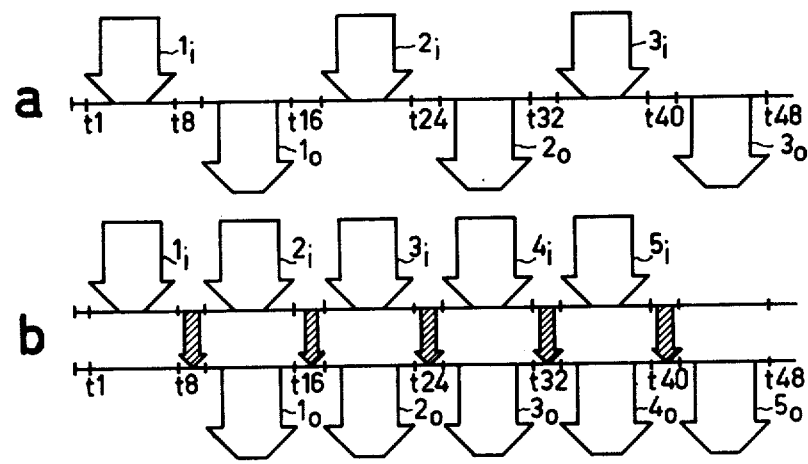
FIG. 3 shows some time bases for explaining the operation of the device according to FIG. 1 and FIG. 2.

FIG. 3 shows some time bases for explaining the operation of the devices shown in FIG. 1 and FIG. 2. The time base shown in FIG. 3A relates to the prior art digital adding device shown in FIG. 1 and the time base of FIG. 3B relates to the digital adding device according to the invention, shown in FIG. 2.

The arrows denoted by $1_i$, $2_i$ etc. show symbolically the presentation of a plurality of numbers, the sum of which must be determined and the arrows denoted by $1_o$, $2_o$ etc. symbolize that a final sum associated with a given series of numbers becomes available.

Starting from the addition shown in Table 2 and Table 3, of four four-bit numbers this means that in the case of FIG. 3A the first series of numbers will be presented between the instants t1 and t8 and that the first final sum is available between the the instants t9 and t16, the second series of numbers can then be offered between the instants t17 and t24, whereafter the second final sum become available between the instants t25 and t32.

In the case of FIG. 3B, on the contrary, a second series of numbers will be presented simultaneously with the availability of the first final sum between the instants t9 and t16. The hatched arrows in FIG. 3B denote that the transfer of intermediate sum and intermediate carriers to the second memory takes place between instants t8 and t9.

FIG. 3 clearly shows the drastic reduction in the time required for computing a plurality of final sums achieved by means of the digital adding device according to the invention.

Figure 4:
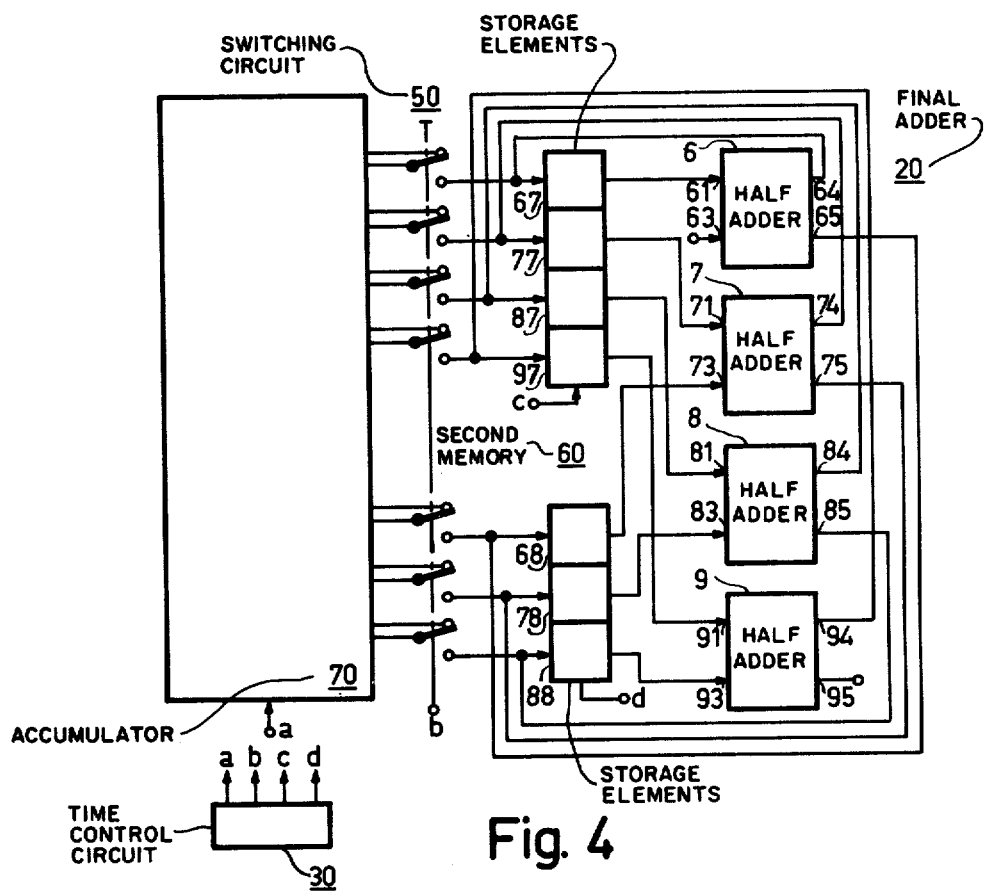
FIG. 4 shows a second embodiment of the digital adding device according to the invention; a parallel adder being used as the final adder.

FIG. 4 shows a second embodiment of a digital adding device according to the invention which, just like the embodiment of FIG. 2, comprises a digital parallel-accumulator 70, a time control circuit 30, a switching circuit 50, a second memory 60 and a final adder 20. Herein the second memory 60 is constituted by the storage elements 67, 77, 87 and 97 (Y7) for storing the intermediate sum and by the storage elements 68, 78, and 88 (Y8) for storing the intermediate carry. However, in this embodiment the final adder 20 is implemented as a parallel-adder comprising the half adders 6, 7, 8 and 9. In addition, the storage elements Y7 are not only used for storing the intermediate sum but also for storing the final sum. The operation of the embodiment of FIG. 4 can again be explained with reference to a number example, the example already used previously with reference to the FIGS. 1 and 2, namely the addition 2+1+1+4=8, is further elaborated in Table 4 to show how the processing of the intermediate sum 0100 and the intermediate carry 010 to final sum is effected.

TABLE 4

| p = | 9 | 8 | 7 | 6 | | t = |
|-----|---|---|---|---|---|-----|
| q = |   |   |   |   |   |     |
| 1 | 0 | 1 | 0 | 0 |   | t9 |
| 3 | 0 | 1 | 0 | 0 | + | t9 |
| 4 | 0 | 0 | 0 | 0 |   | t10 |
| 5 | 0 | 1 | 0 | 0 |   | t10 |
| 1 | 0 | 0 | 0 | 0 |   | t11 |
| 3 | 1 | 0 | 0 | 0 | + | t11 |
| 4 | 1 | 0 | 0 | 0 |   | t12 |
| 5 | 0 | 0 | 0 | 0 |   | t12 |

It should be noted that the storage elements shown in the drawing are formed, when dynamic 4-phase MOS LSI technology is used for implementing the full and the half adders, by small capacitances, which mainly consist of the parasitic capacitances of the internal wiring.

Figure 5:
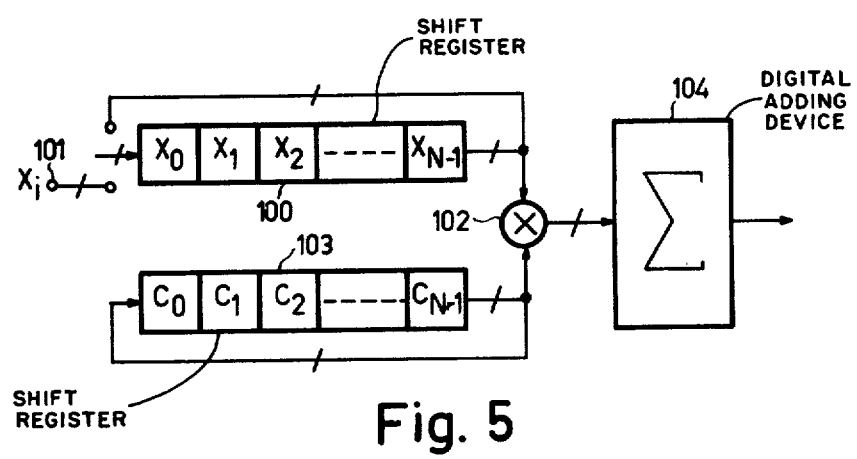
FIG. 5 shows a digital filter having a digital adding device according to the invention.

FIG. 5 shows schematically a digital filter in which the digital adding device according to the invention is used. The digital filter comprises a first circulating shift register 100 having an input 101 to which input codewords $X_i$ occurring at an input sampling rate $f_i$ are supplied, which are multiplied in a multiplier 102 by weighting factors $C_i$ stored in a second circulating shift register 103. For the determination of an output codeword $Y_n$ the sum $$Y_n = \sum_{i=o}^{N-1} C_i X_{n-i}$$

must be determined. The output codewords $Y_n$ must occur at an output rate $f_u$ and to that end the sum $$\sum_{i=o}^{N-1} C_i X_{n-i}$$

is determined once per output period $1/f_u$ in the digital adding device 104. An inclined line in the connecting lines between the various elements indicate that the bits from which the codewords consist are processed in parallel.

What is claimed is:

1. An improved digital adding device for determining the sum of a plurality of n-bit binary coded numbers, said device comprising:

a digital parallel accumulator, said accumulator comprising:

n full adders, each adder corresponding to one of said n-bits, said full adders having inputs to which the bits of the binary coded numbers are transferred and having sum and carry outputs;

a first store having inputs connected to the outputs of said full adders for storing intermediate sums and intermediate carries resulting from the addition and having outputs;

a final adder for determining the sum of each final intermediate sum and final intermediate carry stored in said first store and having inputs;

a coupling circuit for coupling the inputs of said final adder to the outputs of said first store;

a time control circuit having outputs coupled to control inputs of said digital parallel accumulator and said final adder for controlling said digital parallel accumulator and final adder;

said coupling circuit comprising:

a switching circuit connected to the outputs of said first store and having a first and a second switching state; and a second store having an output coupled to said final adder inputs and having an input coupled to said switching circuit;

said time control circuit also controlling said coupling circuit so that in the first switching state the outputs of the first store are coupled to inputs of said full adders and in the second switching state the outputs of said first store are coupled to said second store inputs for taking over the final intermediate sum and the final intermediate carry.

2. A digital filter comprising:

input means for supplying input codewords with a predetermined input sampling frequency;

a storage means for storing a predetermined number of successive input codewords, and having an output;

multiplying means having an input coupled to said output of said storage means for multiplying said stored input codewords with weighting factors and having an output;

a digital adding device comprising:

a digital parallel accumulator, said accumulator comprising:

n full adders, each adder corresponding to one of said n-bits, said full adders having inputs to which the bits of the binary coded numbers are transferred and having sum and carry outputs;

a first store having inputs connected to the outputs of said full adders for storing intermediate sums and intermediate carries resulting from the addition and having outputs;

a final adder for determining the sum of each final intermediate sum and final intermediate carry stored in said first store and having inputs;

a coupling circuit for coupling the inputs of said final adder to the outputs of said first store;

a time control circuit having outputs coupled to control inputs of said digital parallel accumulator and said final adder for controlling said digital parallel accumulator and final adder;

said coupling circuit comprising:

a switching circuit connected to the outputs of said first store and having a first and a second switching state; and a second store having an output coupled to said final adder inputs and having an input coupled to said switching circuit;

said time control circuit also controlling said coupling circuit so that in the first switching state the outputs of the first store are coupled to inputs of said full adders and in the second switching state the outputs of said first store are coupled to said second store inputs for taking over the final intermediate sum and the final intermediate carry; and said digital adding device coupled to the output of said multiplying means for determining output codewords with a predetermined output sampling frequency.

* * * * *